Oct. 15, 1957   H. C. MEAD ET AL   2,809,399
METHOD OF UNITING METAL TO PLASTIC
Filed Aug. 30, 1952
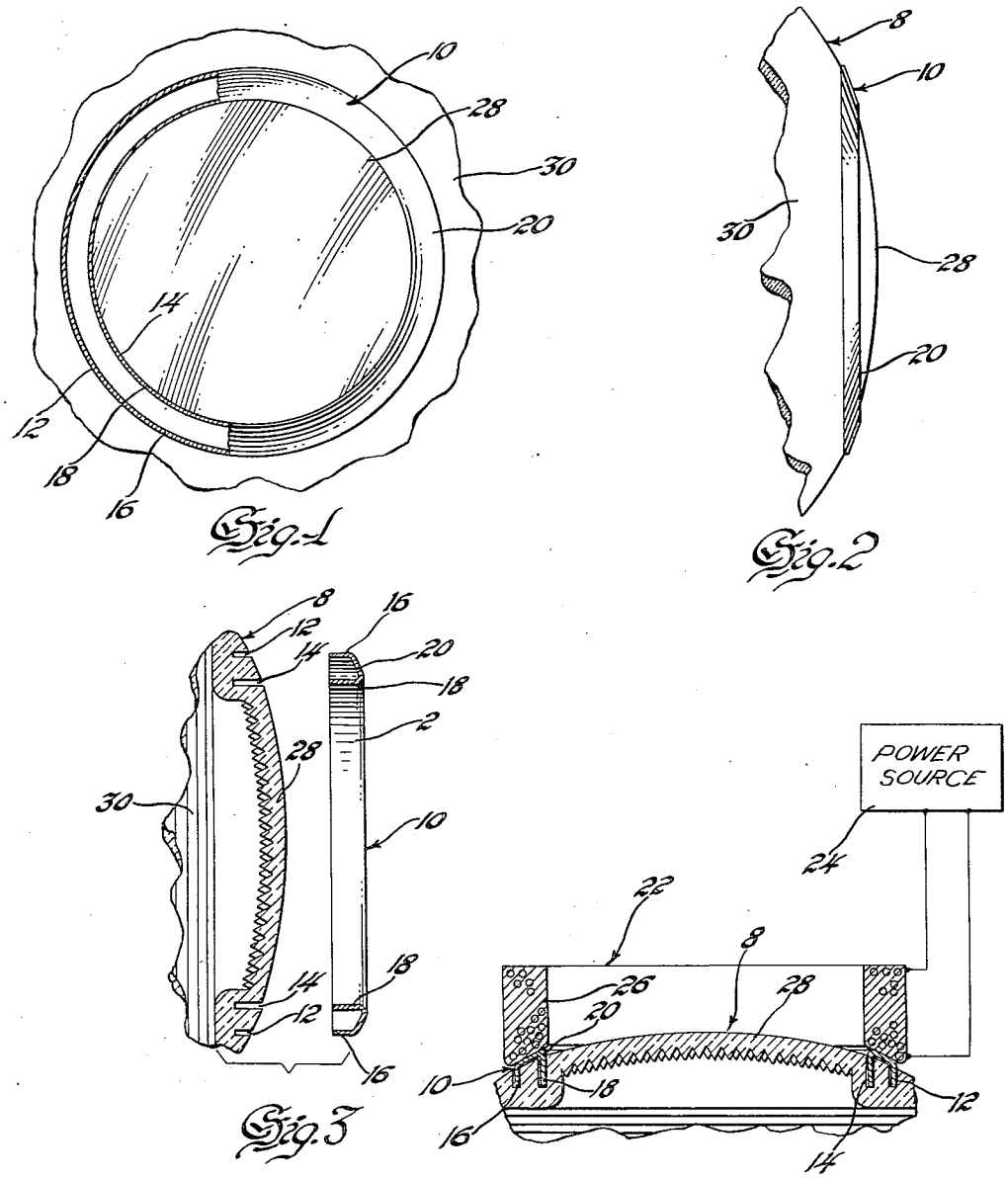
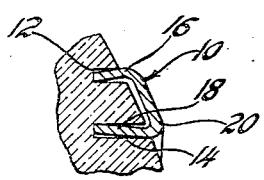
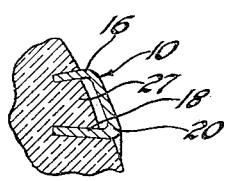
Inventor
Howard C. Mead &
Robert C. Waller
By Willits, Helwig & Baillio
Attorneys United States Patent Office 2,809,399
Patented Oct. 15, 1957

2,809,399
METHOD OF UNITING METAL TO PLASTIC

Howard C. Mead and Robert C. Miller, Anderson, Ind., assignors to General Motors Corporation, Detroit, Mich., a corporation of Delaware Application August 30, 1952, Serial No. 307,234

5 Claims. (Cl. 18—59)

This invention relates to inlaid plastic articles of manufacture and more particularly to plastic articles having a metal insert and to a process for forming such articles.

Numerous methods have been proposed for inlaying plastic articles of manufacture with metal inserts for decorative or for functional purposes. Some of these methods are based on a mechanical interlock between the metal insert and the plastic article obtained by the provision of out-struck portions or some other suitable structure on the edges of the insert. Another method is to heat the metal insert to a temperature above the melting point of the plastic article and then force the insert or portions of it into engagement with the surface of the plastic to cause softening and thereby create recesses in the plastic to embed the metal. Still another method is to heat the plastic to its softening temperature so that the metal may be embedded. Generally speaking, all of these methods have one of two deficiencies. Either they are too expensive, thus rendering their commercial application costly and often impracticable, or else they result in an article which lacks durability in that the metal insert eventually tears loose from the plastic.

It is an object of our invention to provide a metal inlaid plastic article which may be economically manufactured and which has great durability in that the metal insert is permanently and securely embedded in the plastic. Another of the objects of our invention is the provision of a method for inlaying plastic articles which is highly suitable to high production operations and which is simple and economical.

These and other objects of our invention are carried out by first molding or otherwise forming the plastic article with a recess for the accommodation of at least a portion of the metal insert, by positioning the metal insert on the plastic article so that an insert portion is in engagement with the recess provided, and then subsequently applying heat to the metal insert, thereby melting portions of the plastic adjacent the recess to cause the plastic to flow against the insert portion and permanently secure the latter in place.

These and other objects of the invention will appear more clearly from the following description of preferred embodiments and from the accompanying drawing in which:

Figure 1 is a front view, with parts broken away, of a metal inlaid plastic lens embodying the invention;

Figure 2 is a side view of the lens shown in Figure 1;

Figure 3 is a sectional side view of a recessed plastic article and a metal insert prior to their engagement for the heating operation;

Figure 4 is a cross-sectional view of the plastic article and metal insert during the heating step of the process;

Figure 5 is an enlarged cross-sectional view of the plastic article and insert prior to the heating step and shows a preferred structure; and Figure 6 is an enlarged cross-sectional view of the embodiment shown by Figure 5 but after the heating step.

We have used this invention with great success in the manufacture of metal inlaid plastic lenses for automobile lamps, and thus it will be described with reference to the manufacture of such a decorative lens.

Referring now to the drawing, Figure 3 shows a plastic lens 8 and a metal insert 10 in their relationship just before their inter-engagement for the heating step. The lens 8, which may be of any suitable heat-softenable or thermo-plastic material such as, for example, polystyrene, polymethyl methacrylate, the celluloses, the vinyl resins such as polyvinyl chloride, or any of the other well known and numerous thermo-plastics, is provided with two concentric annular recesses 12 and 14 thus forming an annular ridge of thermoplastic material therebetween. The exact size and shape of these recesses will, of course, depend upon the shape and size of the metal insert to be used. As can be seen in Figure 3, the depth of each of the recesses is, in this instance, greater than its width. These recesses may be provided in the plastic article in any suitable manner. We prefer to mold the plastic lens so as to provide the recesses by appropriately shaping the mold cavity, thereby dispensing with a separate recess forming step.

In the particular embodiment shown, the metal insert consists of a ring member 10 formed of steel, brass or other metal, and having inner and outer downwardly extending annular flanges 16 and 18 so as to define a generally U-shaped cross section. The distance between the flanges 16 and 18 is, of course, about the same as that between the recesses 12 and 14 provided in the plastic article. The metal insert 10 may, of course, be shaped by any of the various metal forming processes well known in the art.

The depths of the recesses 12 and 14 are substantially equal to the lengths of the respective flanges 16 and 18 so that, when the ring is positioned on the lens with the flanges extending completely into the recesses, the bottom of the decorative portion 20 of the ring will abut the surface of the plastic lens between the recesses. We have found it preferable to bend the flanges 16 and 18 slightly inwardly or toward each other so as to give the ring a slightly wedge-shaped cross section. Such a structure, of course, requires that the recesses 12 and 14 be of sufficient width to allow insertion of the metal inlay without any binding or wedging. This can be clearly seen in Figure 5 wherein the insert flanges 16 and 18 are shown as bent slightly toward each other and the recesses 12 and 14 are shown to be of sufficient width to allow the ring to bottom without excessive bending. We prefer to size the recesses so that the insert 10 snaps into its bottomed position with but a very slight amount of pressure such, for example, as can be easily applied with the fingers.

Figure 4 shows the plastic lens and metal insert in engagement, the flanges 16 and 18 of the metal insert having been inserted in the recesses 12 and 14 provided on the lens; the ridge of thermoplastic material being positioned between the flanges. It will be noted that, when the insert ring is bottomed as shown by Figures 4 and 5, the decorative portion 20 of the ring extends very slightly above the surface of the lens. If desired, however, the lens may be suitably molded so that when the insert is bottomed the decorative surface of the insert will lie flush with the surface of the plastic article. In the particular embodiment shown, the outer decorative surface of the ring is chromium plated or highly polished to give a pleasing appearance.

With the plastic article and insert in engagement, as shown by Figure 4 and as described above, the metal insert is heated to a temperature above the softening point of the plastic article for a sufficient time to soften the plastic immediately adjacent the flanges 16 and 18.

This heating operation may take anywhere from 3 to 10 seconds, depending upon the nature of the plastic, the metal inlay, etc. For this heating operation we prefer to use an induction-type heater represented by 22 in Figure 4. Such a heater utilizes a high frequency source of electrical energy as a power source 24 to generate in a coil 26 a field to induce currents in the metal inert 10, thereby heating same. By the use of this type of heating means we are able to controllably apply heat to the plastic only where it is needed, i. e., immediately adjacent the surfaces of the metal insert. This prevents deformations and irregularities in the plastic article which may be caused by other types of heating means by way of the fact that greater areas of the plastic article are softened than need be for the embedding and securing of the metal insert. Also, by an induction heater, high production operations are practical because of the rapidity with which the insert may be heated. By the application of heat to the metal insert by means of the induction heater, with the simultaneous conduction of this heat to the surfaces of the plastic immediately adjacent the insert, the plastic material softens and flows against the surfaces of the insert flanges 16 and 18. The heating is then stopped at which time the plastic cools, firmly adhering to or frictionally engaging the metal surfaces. This adherence or engagement of the plastic with the metal surfaces is in and of itself sufficient to firmly and permanently secure the insert to the plastic article. However, when the flanges 16 and 18 of the metal insert are bent slightly, as previously described and as shown by Figure 5, the plastic material, which is between the two recesses, in conforming to the cross-sectional shape of the insert while it is softened, forms a wedge which further precludes the possibility of the insert coming loose from the plastic article. This is shown in Figure 6. It will be noted that the plastic which is between the recesses 12 and 14 has flowed and re-hardened so as to form a wedge shaped mass 27 the surfaces of which abut the flanges 16 and 18.

Figures 1 and 2 show the completed metal inlaid plastic lens. The lens, which in this instance is of a red colored plastic for use on an automobile rear lamp, is provided with a center reflex portion 28 and with a portion 30 having a series of annular prisms, the metal insert 10 serving as a decorative ring separating the two optical portions of the lens.

The invention, of course, is not limited to use with the particular metal insert shown and described, but can be used with various shapes and sizes of inserts. It will be obvious, for example, that the insert could, if desired, be provided with only one flange to cooperate with a suitably shaped single recess in the plastic article.

While the embodiment of the present invention as herein disclosed constitutes a preferred form, it is to be understood that other forms might be adopted, all coming within the scope of the following claims.

What we claim as new and desire to obtain by Letters Patent of the United States is:

1. A method for securing a metal member to a thermoplastic article comprising the steps of forming the thermoplastic article with an integral elongated ridge having upwardly extending side walls, forming the metal member with a pair of substantially downwardly extending and converging flanges, placing said metal member on said thermoplastic article so that said ridge is positioned between said flanges and is incased in said metal member, heating said metal member to soften said ridge thereby causing at least some portions of said ridge to flow against said flanges to form an interlock between said metal member and said thermoplastic article, and then allowing said article to cool to harden the thermoplastic.

2. A method for securing a metal member to a thermoplastic article comprising the steps of forming the thermoplastic article with an integral elongated ridge having upwardly extending side walls, forming the metal member with a pair of substantially downwardly extending and converging flanges, placing said metal member on said thermoplastic article so that said ridge is positioned between said flanges and is incased in said metal member, inductively heating said metal member to soften said ridge thereby causing at least some portions of said ridge to flow against said flanges to form an interlock between said metal member and said thermoplastic article, and then allowing said article to cool to harden the thermoplastic.

3. A method for securing a metal member to a thermoplastic article comprising the steps of forming the thermoplastic article with a pair of elongated recesses to thereby provide an elongated ridge between said recesses, forming a metal member with a pair of substantially downwardly extending and converging flanges, placing the metal member on the thermoplastic article so that each of said flanges is within one of said recessses with the thermoplastic ridge between said flanges and incased in said metal member, heating said metal member to soften said thermoplastic article only immediately adjacent said flanges thereby causing the thermoplastic to flow against the flanges within said recsses, and then allowing said article to cool to harden the thermoplastic.

4. A method for securing a metal member to a thermoplastic article comprising the steps of forming the thermoplastic article with a pair of elongated recesses to thereby provide an elongated ridge between said recesses, forming a metal member with a pair of substantially downwardly extending and converging flanges, placing the metal member on the thermoplastic article so that each of said flanges is within one of said recesses with the thermoplastic ridge between said flanges and incased by said metal member, inductively heating said metal member to soften said thermoplastic article only immediately adjacent said flanges thereby causing the thermoplastic to flow against the flanges within said recesses, and then allowing said article to cool to harden the thermoplastic.

5. A method for securing a metal member to a thermoplastic article comprising the steps of forming the thermoplastic article with a pair of concentric annular recesses to thereby provide an annular ridge between said recesses, forming a ring-shaped metal member with a pair of substantially downwardly extending annular flanges converging inwardly toward each other, placing said metal member on said thermoplastic article so that each of said flanges is within one of said recesses with the thermoplastic ridge positioned between said flanges and incased by said metal member, inductively heating said metal member to soften said thermoplastic article only immediately adjacent said flanges thereby causing the thermoplastic to flow against the flanges within said recesses, and then allowing said article to cool to harden the thermoplastic.

References Cited in the file of this patent

UNITED STATES PATENTS

| 747,053 | Ehrlich | Dec. 15, 1903 |
|---|---|---|
| 1,839,653 | Curtis | Jan. 5, 1932 |
| 2,125,316 | Ronci | Aug. 2, 1938 |
| 2,237,152 | Larmour | Apr. 1, 1941 |
| 2,247,558 | Nichols | July 1, 1941 |
| 2,364,226 | Larmour | Dec. 5, 1944 |
| 2,607,082 | Starke | Aug. 19, 1952 |
| 2,635,328 | Larmour | Apr. 21, 1953 |
| 2,642,911 | Shazor | June 23, 1953 |